April 7, 1970  W. R. BATTERSBY  3,505,261
HOT MELT ADHESIVE COMPOSITIONS
Filed Jan. 24, 1969

Inventor
William R. Battersby
By his Attorney
Benjamin C. Pollard

United States Patent Office 3,505,261
Patented Apr. 7, 1970

3,505,261
HOT MELT ADHESIVE COMPOSITIONS
William R. Battersby, Lexington, Mass., assignor to USM Corporation, Flemington, N.J., a corporation of New Jersey
Continuation-in-part of application Ser. No. 562,255, July 1, 1966, which is a continuation-in-part of application Ser. No. 433,002, Feb. 16, 1965. This application Jan. 24, 1969, Ser. No. 793,700
Int. Cl. C08f 45/04
U.S. Cl. 260—28.5        6 Claims

ABSTRACT OF THE DISCLOSURE

A hot melt adhesive composition in which a copolymer of ethylene and vinyl acetate is combined with a phenoxy resin, e.g. a polyether condensation product, a dihydric phenol and an epoxide containing one to two epoxide groups, certain low melting resins such as polystyrene, polybetapinene, polyalphapinene, hydrogenated rosin, ester gum or coumarene indene resin and a chlorinated polyphenyl in special ranges of relative proportions. In the proportions used, the resins cooperate with each other to provide ability to wet and adhere to a wide variety of surfaces and to provide a useful open time and quick setting to a strong, firm adhesive bond.

---

Figure 1:
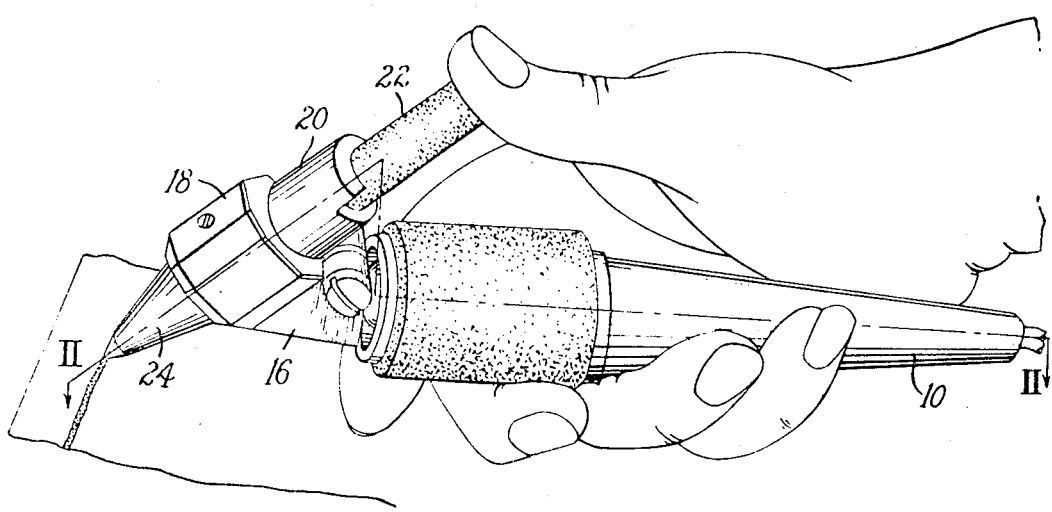

This application is a continuation-in-part of my prior application Ser. No. 562,255, filed July 1, 1966, entitled "Hot Melt Adhesive Compositions," that application being a continuation-in-part of my prior application Ser No. 433,002 filed Feb. 16, 1965, also entitled "Hot Melt Adhesive Compositions," both applications now being abandoned.

This invention relates to a novel hot melt adhesive composition.

Joining of surfaces may be effected by mechanical fastenings such as nails or screws, by adhesives and by combinations of mechanical fastenings and adhesive. Particularly in do-it-yourself operations the choice is sometimes difficult since mechanical fastening is relatively quick but tends to give a weaker or more readily loosened joint while adhesive joints may be firm but are slow to set and require holding the surfaces together for extended periods until the adhesive has set. Industrial operations involving high speed production increasingly tend to use hot melt adhesives which are applied by machines and the coated surfaces pressed together by mechanical devices usually in a matter of fractions of seconds. Such adhesive operations are not suited to the common do-it-yourself operation since the hot melt industrial adhesives would have set up long before parts could be assembled by manual operations. That is, industrial adhesives designed for even longer than usual "open time," have reached a non-adhesive state long before the 5 second period generally accepted as a minimum time for assembly of simple units by hand.

It is an object of the present invention to provide a hot melt adhesive composition capable of bonding to the wide variety of surfaces encountered in do-it-yourself operations and possessing the unusual ability to remain actively adhesive for periods at least as long as the minimum needed for manual assembly and also the property of developing an adequate strength bond between surfaces pressed together with the adhesive between them.

To this end and in accordance with a feature of the present invention I have provided an adhesive composition in which resins are selected and combined in relative proportions for cooperation with each other to insure spreadability and retain adhesive ability when applied in molten condition on a surface, and also cooperating to set up quickly after completion of the adhesive joint to a strong, firm union. In the form of uniform cross section cylinders or rods, the composition is solid and shape retaining at room temperatures for use in melting and applying devices.

Figure 2:
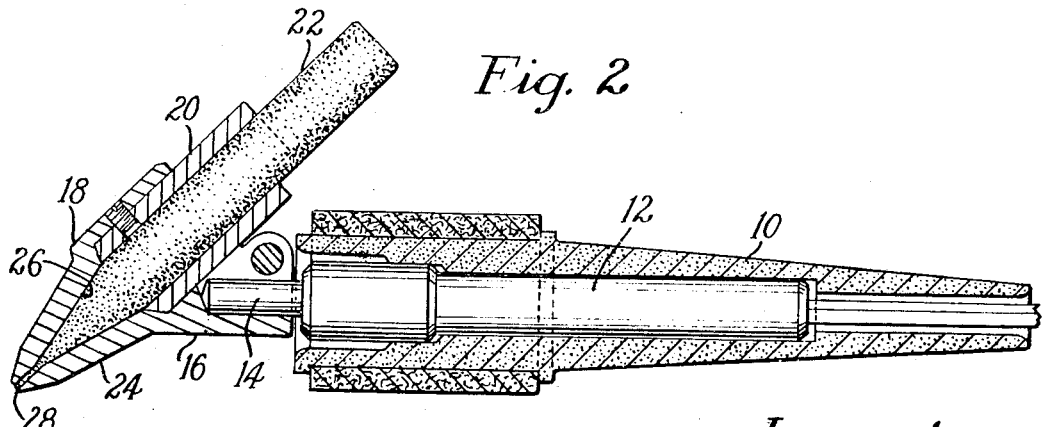

In the drawing,

FIG. 1 is a perspective view showing the adhesive in rod form being melted and applied to a surface by a hand held melting and applying tool; and FIG. 2 is a setcional view taken along the line II—II of FIG. 1 showing the melting and applying device and an adhesive rod in position for use.

In the adhesive a copolymer of ethylene and vinyl acetate is blended with a phenoxy resin, certain low melting resins and a chlorinated polyphenyl. Within the ranges of relative proportions discovered by applicant, the phenoxy resin in the adhesive provides good adhesion to a variety of surfaces and imparts cohesive strength to the whole composition. Surprisingly, only a relatively small percentage of this resin is needed so that as much as 20% of the phenoxy resin by weight of the thermoplastic components provides very little more effectiveness than a 5% addition. The phenoxy resin gives valuable properties in proportions as low as 2% and the preferred range is from 3 to 10%.

Phenoxy resins useful in the adhesive of the present invention are the thermoplastic polyether condensation products of substantially equimolar parts of a dihydric phenol and an epoxide containing from one to two epoxide groups. Preferred phenoxy resins are the thermoplastic poly(monohydroxyether) reaction products of substantially equimolar parts of 2,2 bis(4-hydroxy phenyl)-propane and epichlorhydrin. These resins have a degree of polymerization of at least 30, i.e. include at least 30 repeating units, and more preferably have a degree of polymerization of at least 80. The end bonds of the polymer molecule are usually joined to hydrogen; but sodium or other groups from the catalyst may occupy these positions. In any case since the molecule is so large, the atom or group situated at the end of the molecule is of little importance. Reference is made to U.S. Patent 3,238,087 of Mar. 1, 1966, to Norwalk et al. for a description of a procedure for making such phenoxy resin. Other high molecular weight linear thermoplastic polyether condensation products are the condensation products from reacting initial condensate of epichlorhydrin and a dihydric phenol such as bis-phenol A with additional dihydric phenol as described in U.S. Patent 3,177,090 of Apr. 6, 1965. In the resins of this patent, the molecular weight of resins useful in the present relation will be the same range but the resin may contain minor amounts of epoxy end groups, there being, however, a substantial excess of non-epoxy end groups over epoxy end groups.

The ethylene-vinyl acetate copolymer in proportions of from about 30% to about 50% by weight of the thermoplastic components, is particularly useful in enabling the other components to function together most effectively. That is, the selected copolymer provides compatibility with other resins which, without the selected copolymer, would not cooperate in the same desirable fashion. In addition to improving the coopative action of the other components in functioning as an adhesive, the copolymer gives to the mass of the adhesive a high degree of cohesive strength. Ethylene-vinyl acetate copolymers may have vinyl acetate percentages in the copolymer molecule of from about 28 to 40%. Also more than one copolymer may be used. It is preferred to use copolymers melting in the range of from about 85° to 175° C.

The preferred low melting resin is a low molecular weight polystyrene material which is combined in the adhesive to give a number of desirable properties in the particular relationship with the polyether condensation product and copolymer. Such properties include tack improvement, that is, the ability to wet and adhere to a variety of surfaces, and a flexibilizing and flow-promoting action. Other low melting resins which may be combined with the copolymer and polyether condensation product include polybetapinene, polyalphapinene, hydrogenated rosin, ester gum and coumarone indene resins, these resins having melting points of from about 50° to about 85° C. While these are useful to give adhesion, the low molecular weight polystyrene has a special action of delaying the loss of adhesive ability after the composition is applied in molten condition. Applicant believes that, when present to the extent of at least about 20% by weight, the low molecular weight polystyrene gives this latter action because of its melting range and low compatibility with the polyether condensation product and ethylene-vinyl acetate copolymer. Although patentability of the composition does not depend upon the correctness of this theory, it appears that the resistance to orderly molecular arrangement of the low molecular weight polystyrene with the polyether condensation product and ethylene-vinyl acetate copolymers delays the hardening and loss of adhesive ability of the composition to enable surfaces to be assembled in the convenient time. Suitable low molecular weight polystyrenes may have melting points of from about 50° C. to about 85° C. (ball and ring). The low melting point resins may be used to the extent of up to about 40% by weight based on the weight of the thermoplastic components of the adhesive composition.

In combination with the polyether condensation product, the ethylene-vinyl acetate copolymer and the low melting resin, a chlorinated polyphenyl having a chlorine content of from about 40% to about 65% is effective to control the physical shape retention and melting characteristics of the adhesive composition. That is, this material is normally solid but melts at a relatively low temperature and provides in molten condition a maximum softening effect on the other components of the adhesive composition. It is found that the chlorinated polyphenyl will provide this desirable action when used to the extent of from about 15% to about 40% by weight based on the weight of the thermoplastic components of the composition.

There may also be included in the composition a small percentage of a wax. This wax cooperates in giving stiffness and blocking resistance to the composition at normal temperatures together with ease of molding and also fluidity in molten condition. In general, from about 1% to about 10% of the wax by weight may used. A preferred wax is a Fischer-Tropsch synthetic hydrocarbon wax having a melting point of about 214° F., but other waxes such as microcrystalline wax and even a low molecular weight polyethylene (molecular weight 2500 to 7500) or carnauba wax may be used.

Manufacture of the adhesive composition involves mixing and kneading of the polyether condensation product followed by addition of the ethylene-vinyl acetate copolymer and then of a portion of the ethylene-vinyl acetate copolymer and of the low molecular weight polystyrene. This pre-mix may thereafter be combined with the remaining materials in a heated mixer followed by forming of the adhesive to the desired shape.

The adhesive composition is particularly useful in the form of cylinders for use in a hand held melting and applying device such as that shown in the copending application of Hans C. Paulsen, Ser. No. 352,002 entitled "Portable Thermoplastic Cement Dispenser," filed Mar. 16, 1964, now U.S. Patent No. 3,204,828, which issued Sept. 7, 1965.

The Paulsen melting and applying device comprises a non-heat-conducting handle 10, an electrical heating element 12 in the handle and a heat conducting rod 14 projecting therefrom. A portion 16 of a barrel member 18 is secured to the rod 14 so as to be spaced slightly from the handle 10 with the rod 14 conducting heat from the heating element 12 to the barrel member. The upper portion of the barrel member 18 receives a tubular sleeve 20 made of a non-heat-conducting material having a low coefficient of friction such as Teflon (polytetrafluoroethylene). The sleeve 20 is adapted to receive a cylindrical thermoplastic cement body or rod 22 in solid form and having a diameter snugly fitting the inside diameter of the sleeve 20. At one end of the sleeve 20 there is provided in a nozzle portion 24 of the barrel member a cone-shaped melting chamber 26 from which discharge passage 28 leads outwardly.

The handle 10 of the tool is adapted to be held in an operator's hand as seen in FIG. 1. To dispense molten cement from the passage 28 a thermoplastic cement rod 22, which may conveniently be approximately three inches in length is inserted in the sleeve 20. The lower end of the rod is guided by the sleeve 20 into the chamber 26 where heat conducted through the rod 14 acts to melt only the very end of the rod. The opposite end of the rod 22 projects from the upper end of the sleeve 20 where it may be conveniently engaged by an operator's thumb as seen in FIG. 1. The sleeve 20, being non-conductive, permits substantial heating of the thermoplastic rod 22 only in the lower region of the sleeve. The rod therefore melts only in the chamber 26, and the portion in the lower region of the sleeve 20 while not being heated sufficiently to cause melting is heated enough to cause expansion of the rod into a rather tight fit with the sleeve so as to prevent backflow of the melted cement in the chamber 26. Because of the low degree of frictional resistance of the sleeve 20 the thermoplastic rod is easily moved in the sleeve by a pushing movement of the operator's thumb. However, because of the expansion of the thermoplastic rod a continuous seal exists in the sleeve which prevents any backward oozing of the molten cement. When molten cement is to be dispensed from the passage 28 the operator pushes the rod 22 into the sleeve 20. As it moves along the sleeve, the rod acts as a piston upon the molten cement in the melting chamber 26 and the pressure thus generated forces the cement through the discharge passage 28 for application to a workpiece 30 as shown in FIG. 1. To stop the flow of cement from the passage 28 the operator removes his thumb from the rod 22.

In the adhesive dispenser with the heat of the nozzle portion set at 400 to 425° F. it is found that the adhesive melts smoothly and is easily applied and spread on a surface to be bonded and that for periods up to as high as 30 seconds effective bonds are obtainable with the deposited adhesive. Also because of its physical nature, the adhesive form retains its integrity so that it can be readily pushed forward without flow-back of adhesive around the adhesive form or, if desired, withdrawn from the gun without breaking off. It appears that part of the desirable behavior of the adhesive is due to its viscosity which may be from about 10,000 to 25,000 cps. at 50 reciprocal seconds as determined on the extrusion rheometer at 190° C. The ball and ring melting range of the adhesive is from 90 to 98° C.

The strength of the adhesive in its physical form as well as in the adhesive bonded system is attributable to the cohesion imparted by the slected components and their ratio. Yet these evidences of adhesive integrity are achieved where the ball and ring melting range of the adhesive is from 90 to 98° C. providing maximum ease of handling.

While the adhesive composition has been described above in terms of its heat fusible components, for various purposes it may be desirable to include up to as high as about 25% of a mineral filler by weight based on the weight of the composition. This mineral filler may be for the purpose of providing pigmentation, for example, to provide a white or colored adhesive or may be present for reinforcing purposes. Suitable mineral fillers include calcium silicate (wollastonite), carbon black, titanium dioxide and other known mineral fillers.

The following examples are given to aid in understanding the invention, but it is to be understood that the invention is not restricted to the particular materials, proportions or procedures set forth in the following examples.

EXAMPLE I 5 parts by weight of a polyether condensation product "Bakelite Phenoxy Resin PAHJ" a thermoplastic poly-(monohydroxy ether) condensate of substantially equimolar parts of 2,2 bis (4-hydroxyphenyl)-propane and epichlorhydrin having the repeating unit

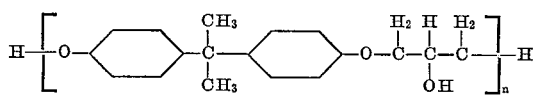

where $n$ is about 100 and having a Brookfield viscosity (40% solids in MEK) of 6200–10,000 and a softening temperature of 212° F., were introduced into a WP mixer set at about 350° F. and worked to a continuous mass. Thereafter 10 parts by weight of ethylene-vinyl acetate copolymer (40% vinyl acetate in the copolymer molecule) and 10 parts of low molecular weight polystyrene melting at 75° C. ball and ring and having a molecular weight of 400, specific gravity of 1.05 and a refractive index at 25° C. at 1.60 were added to the mixer and worked to form a uniform dispersion. Thereafter 30 parts of ethylene-vinyl acetate copolymer (28% vinyl acetate in the copolymer molecule) were combined with the above-prepared compound and uniformly mixed and finally 15 parts of low molecular weight polystyrene, 28 parts of chlorinated polyphenyl (60% chlorine) and 2 parts by weight of Fischer-Tropsch hydrocarbon wax (melting point 214° F.) were added and intimately mixed in. This adhesive had a viscosity at 190° C. of 20,000 cps. at 50 reciprocal seconds as determined by the extrusion rheometer. The composition was molded into cylindrical blocks of ½ inch diameter and about 1½ inch length. When melted and dispensed from the thermoplastic cement dispenser of the Paulsen patent referred to above with its heating surface set at 400 to 425° F. the adhesive melted to form a smooth, clear, easily spread liquid. When applied to surfaces of paper, leather, polystyrene, wood, metal, glass it was found that excellent bonds were established when assembled to such surfaces and other surfaces and that such assembly could be accomplished within times convenient for manual assembly.

EXAMPLE II 76 parts by weight of the composition of Example I were combined with 15 parts by weight of finely divided titanium dioxide and 9% of finely divided calcium silicate. This composition was molded into cylindrical blocks ½" diameter and about 1½" in length and was melted and dispensed from the thermoplastic cement dispenser of the Paulsen patent above referred to under the same conditions as the product of Example I. The adhesive melted to form a smooth white easily spread liquid and adhered well to paper, leather, polystyrene, wood, metal and glass. The product was particularly useful for filling cracks around ceramic articles such as the crack between a porcelain bathtub and a wall and also for filling cracks in painted articles.

EXAMPLE III

An adhesive composition was prepared by the procedure used in Example I having the following composition:

| Component: | Parts by weight |
|---|---|
| Polyether condensation product (Bakelite Phenoxy Resin PAHJ) | 5 |
| Eethylene-vinyl acetate copolymer (30% vinyl acetate in the copolymer molecule) | 40 |
| Low molecular weight polystyrene | 25 |
| Chlorinated polyphenyl (42% chlorine) | 28 |
| Fischer-Tropsch hydrocarbon wax (melting point 214° F.) | 2 |

This adhesive had a viscosity at 190° C. of 11,500 cps. at 50 reciprocal seconds as determined by the extrusion rheometer. The composition was molded into cylindrical blocks of ½ inch diameter and about 1½ inch length. When melted and dispensed from the thermoplastic cement dispenser of the Paulsen patent referred to above with its heating surface set at 400 to 425° F. the adhesive melted to form a smooth, clear, easily spread liquid. When applied to surfaces of paper, leather, polystyrene, wood, metal, glass it was found that excellent bonds were established when assembled to such surfaces and other surfaces and that such assembly could be accomplished within times convenient for manual assembly.

Having thus described my invention, what I claim as new and desire to secure by Letters Patent of the United States is:

1. An adhesive composition for application in molten condition to form strong bonds to a variety of surfaces, the heat fusible components of said adhesive comprising an intimate mixture of from about 30 to about 50% by weight of a copolymer of from 60 to 72% ethylene and 28 to 40% vinyl acetate melting in the range of from about 85° to 175° C., at least about 2% by weight of thermoplastic polyether condensation product of substantially equimolar parts of 2,2-bis(4-hydroxy phenyl)propane and epichlorohydrin, there being a substantial excess of non-epoxy end groups over any epoxy end groups on said reaction product, from about 20% to about 40% of a low melting resin from the group consisting of low molecular weight polystyrene, polybetapinene, polyalphapinene, hydrogenated rosin, ester gum and coumarone indene resin, having a ball and ring softening point of from about 50° to about 85° C. and from about 15% to about 40% of a chlorinated polyphenyl having a chlorine content of from about 40% to about 65%, said adhesive having a viscosity at 190° C. of from about 10,000 to about 25,000 centipoises at 50 reciprocal seconds as determined on the extrusion rheometer, a ball and ring softening range of from about 90° to about 100° C. and having an open time as determined by its ability to establish a bond when deposited at 400° to 425° F. on a non-heat-conductive surface of at least 5 seconds.

2. An adhesive composition as defined in claim 1 in which said condensation product has a degree of polymerization of at least 30.

3. An adhesive composition as defined in claim 2 in which the epoxide is epichlorohydrin, and said condensation product has a degree of polymerization of at least 80 and has substantially no terminal highly reactive epoxy groups.

4. An adhesive composition as defined in claim 3 containing from about 3% to about 10% by weight of said thermoplastic polyether condensation product, and in which said low melting resin is low molecular weight polystyrene having a ball and ring softening point of from about 50° to about 85° C.

5. An adhesive composition as defined in claim 4 containing from about 1% to about 10% of a wax.

6. An adhesive composition as defined in claim 5 containing a mineral filler in amount up to 25% by weight based on the weight of the composition.

References Cited

UNITED STATES PATENTS

| | | | |
|---|---|---|---|
| 2,975,150 | 3/1961 | Johnson et al. | 260—27 |
| 3,025,167 | 3/1962 | Butler | 260—28.5 |
| 3,177,090 | 4/1965 | Bayes et al. | 260—836 |
| 3,238,087 | 3/1966 | Norwalk et al. | 260—836 |

ALLAN LIEBERMAN, Primary Examiner

S. L. FOX, Assistant Examiner

U.S. Cl. X.R.

260—27, 41, 836, 837